United States Patent [19]

Klok

[11] 4,404,753

[45] Sep. 20, 1983

[54] CARPENTER'S SAW GUIDE AND SQUARE

[76] Inventor: Henri Klok, P.O. Box 13714, Houston, Tex. 77219

[21] Appl. No.: 330,966

[22] Filed: Dec. 15, 1981

[51] Int. Cl.[3] .......... G01C 9/24

[52] U.S. Cl. .......... 33/451; 33/474; 33/476; 33/482; 33/371

[58] Field of Search .......... 33/437, 451, 482, 474, 33/481, 480, 479, 403, 371, 370, 476

[56] References Cited

U.S. PATENT DOCUMENTS

| | | | |
|---|---|---|---|
| 1,291,476 | 1/1919 | Gilson | 33/476 |
| 1,619,427 | 3/1927 | McCaffery | 33/476 |
| 1,855,394 | 4/1932 | Hill | 33/451 X |
| 2,043,729 | 6/1936 | Bilder | 33/476 |
| 2,247,327 | 6/1941 | Brady | 33/451 |
| 2,610,407 | 9/1952 | McQuaid, Sr. | 33/374 |
| 2,633,640 | 4/1953 | Bucsko | 33/451 |
| 4,338,725 | 7/1982 | Martin et al. | 33/482 |

*Primary Examiner*—William D. Martin, Jr.

[57] ABSTRACT

A lightweight portable carpenter's tool that singularly performs the functions of triangle, ruler, square, protractor, and leveling device. The special protractor function allows for continuous same plane usage in order to scribe material or to guide a power saw across a given material.

1 Claim, 6 Drawing Figures

CARPENTER'S SAW GUIDE AND SQUARE

BRIEF SUMMARY OF THE INVENTION

The traditional carpenter's square in order to adjust to the variable angles required by the workman in the pursuit of his task is hereby deployed as a right angle isosceles triangle constructed with a 180° protractor about the center of the hypotenuse. This protractor is offset at the 90° point to allow for continuous, same plane utilization. This triangle squaring device will make angles with its hypotenuse for marking or for guiding a power saw without necessitating the overturning of the device. This invention also performs the functions of a square, a ruler, a triangle, and as a four point level.

DESCRIPTION OF THE PREFERRED EMBODIMENT

Figure 1:
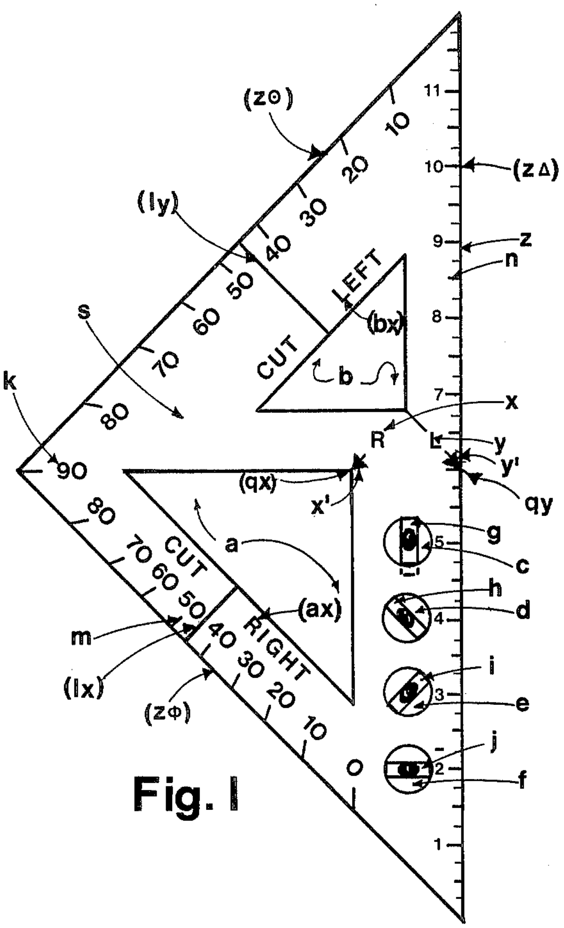
FIG. 1 is the top view of the invention having a view of the cutouts of material and the location of four sets of level metering devices and the necessary stamping to be found on the face of said invention.
Figure 3:
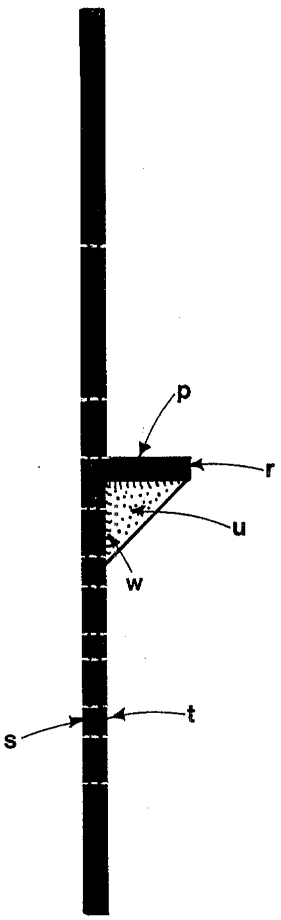
FIG. 3 is the side view showing the referred to hypotenuse edge of the invention with the side view of the downward projecting pivoting heel flange and its necessary buttress flange.
Figure 2:
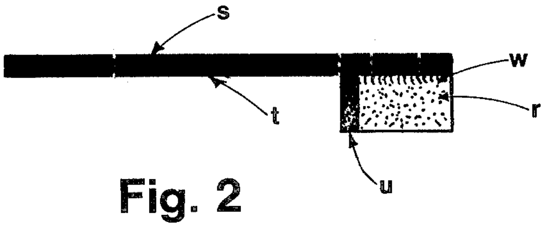
FIG. 2 is the end view of the referred to Right Leg with the pivoting heel flange shown as it appears attached to the bottom side of the invention.
Figure 4:
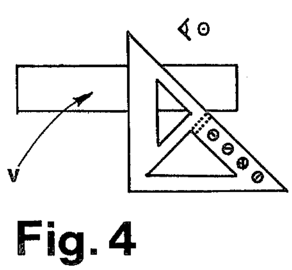
FIG. 4 is the device shown in use on a given material with the flange abutted on its right edge and forming an angle with the hypotenuse to the left of the user.
Figure 5:
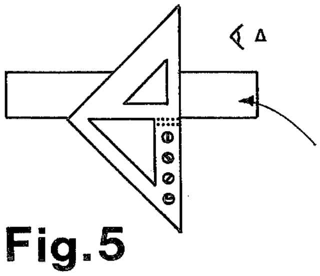
FIG. 5 is the device shown in use on a given material with the flange abutted directly square and forming an exact right angle with the hypotenuse across the material.
Figure 6:
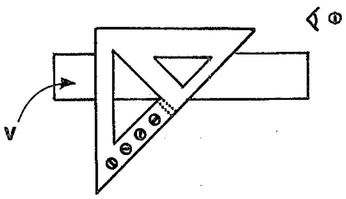
FIG. 6 is the device shown in use on a given material with the flange abutted on its left edge and forming an angle with the hypotenuse to the right of the user.
Figure 7:
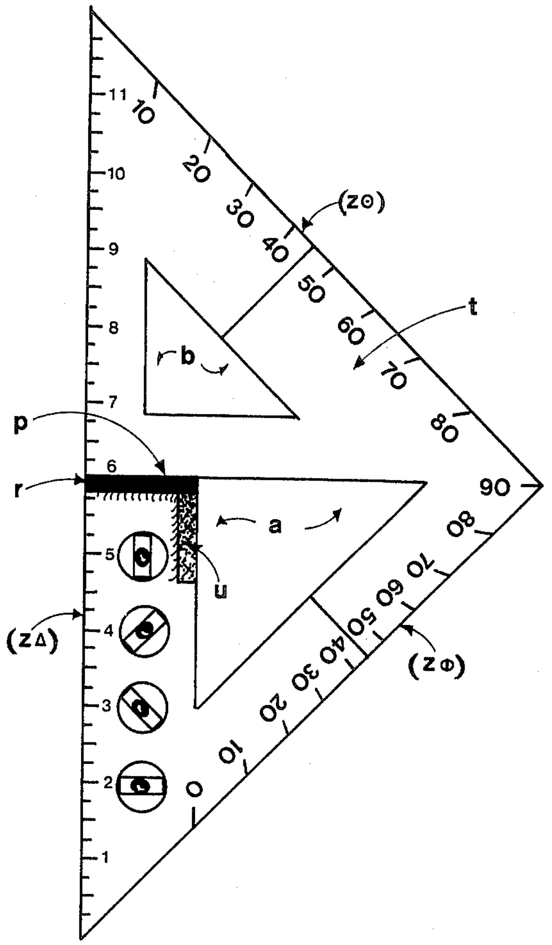
FIG. 7 is the bottom of said device illustrating the mirror-like reflection of the top stamped markings, the protruding squaring flange, and the four leveling devices as they appear from the bottom view.

The invention is basically an isosceles right triangle made of steel or aluminum with a 12" long ruled edge (zΔ) as the hypotenuse, a 6" long right leg (zΦ), a 6" long left leg (zθ). The left leg (zθ) is shown at the top of the FIG. 1, the right leg (zΦ) at the bottom of FIG. 1. The hypotenuse (zΔ) serves as a straightedge and as a ruler calibrated in ¼ inch increments (n) proceeding from 0" at the intersection of the hypotenuse and the right leg (zΦ) to 12" at the intersection of the hypotenuse and the left leg (zθ). The left leg's (zθ) center of radius (qy) is located at the center point of the ruled hypotenuse (zΔ). This center of radius (qy) is marked by a letter "L" (y) and a small arrow (y') stamped into the top fascia (s) of the triangle at this same location (qy). The right leg's (zΦ) center of radius (qx) is artificially offset and located a predetermined 1½" from the left leg's center of radius (qx) along the imaginary center line between the equal halves of the isosceles triangle as a whole. This center of radius (qx) is marked by a letter "R" (x) with a small arrow (x') stamped into the fascia. The dual center of radius points (qx, qy) are offset by the aforementioned 1½" to allow for the squaring function of the squaring heel (r) that is made of the same identical material as the mentioned isosceles triangle and is attached directly by welding (w) to the bottom (t) of this same triangle. The face (p) of said heel (r) is overtly in line with the imaginary center dividing line of the two equal halves of the same isosceles triangle. Said heel (r) forms a plane with which one can easily square up the invention against an item to be marked or cut as illustrated in FIG. 5 Angle (Δ) delta. This invention would be routinely held in place manually during use. The heel (r) is structurally reinforced by a buttress (u) welded (w) and fitted perpendicular to said heel (r) made also of the same material as the triangle. The heel (r) itself protrudes about 1" or so from the bottom (t) of said isosceles triangle whilst the top face (s) remains entirely flat. The bottom (t) of said triangle is etched and calibrated in the same equal increments as the top side, in a directly reflected manner, serving thence also as a plane triangle, ruler, and protractor. The pivot points R (qx) and L (qy) have the same pivot points in use on the bottom (t) side. The right leg (zΦ) remains the right leg (zΦ) on the bottom (t) side and the left leg (zθ) remains the left leg (zθ) on the bottom (t) side. The hypotenuse on the bottom (t) side is calibrated also in a reflected manner so that the increments proceed from 0" at the intersection of the hypotenuse and the right leg (zΦ) to 12" at the intersection of the hypotenuse and the left leg (zθ). The bottom side (t) is shown in FIG. 7. The left leg (zθ) and the right leg (zΦ) are marked in 10° angle increments (k) from 0° to 90°. The degree markings (k) have respective etched lines (m) showing their exact point locations along the right and left legs (zΦ, zθ). The right and left leg 45° lines (lx, ly) are etched in exaggeratedly long lines since they are more commonly used. The pivot then about point "R" (qx) or Right is intended to be used when power tool guiding or pencil marking along the edge of the calibrated hypotenuse in an angle toward the right of the user is required, as shown in FIG. 6 Angle (Φ) phi. Likewise the pivot of the invention about its point "L" (qy) is intended when power tool guiding or pencil marking along the edge of the calibrated hypotenuse in an angle toward the left of the user is required, as shown in FIG. 4 Angle (θ) theta. In order to lessen the overall weight of the invention, certain triangular segments have been cut from the body of the mentioned isosceles triangle. The cutout for the left leg's half section (b) is smaller that the cutout for the right leg's half section (a) in order to compensate for, and balance, the loss of gravitational stability once the tool is placed on the work surface as shown in FIGS. 4, 5, & 6. Also to increase the stability of said tool, four (4) additional round apertures (c,d,e,f) have been made at regular intervals of about 1 inch each, in the right half section directly adjacent to the calibrations (n) of the ruled hypotenuse. This invention is also a framing square and therefore would be improved by the inclusion of four (4) leveling devices set flush inside said four (4) apertures. These levels (g,h,i,j) are set for the four utilitarian surfaces in which this square might be employed. The four surfaces are the left leg (zθ), the right leg (zΦ), the hypotenuse (zΔ), and the face of the squaring heel (p). The hypotenuse set flatly upon a surface with the plane of the whole triangle perpendicular to the earth's center would engage the level (g) located in the first aperture (c) closest to the hypotenuse midpoint (qy). The right leg set flatly upon a surface with the plane of the whole triangle perpendicular to the earth's center would engage the level (h) in the second most aperture (d) from the hypotenuse midpoint (qy). The left leg set flatly upon a surface with the plane of the whole triangle perpendicular to the center of the earth would engage the level (i) in the third most aperture (e) from the hypotenuse midpoint (qy). The squaring heel surface (p) set up against a horizontal member with the plane of the whole triangle perpendicular to the center of the earth would engage the level (j) in the fourth most aperture (f) from the midpoint of said hypotenuse.

I claim:

1. A measuring, angle marking, squaring, and saw guiding device comprising an isosceles right triangle with the hypotenuse forming a measuring and guiding edge having a calibrated scale with its zero index at one end and progressing onward to the opposite end of said hypotenuse, which has mounted to the underside face exactly at the midpoint of the hypotenuse a squaring and pivot flange whose edges create two distinct protraction conditions relative to the edges of the isosceles triangle formed by said equal legs, with the outward edge of said flange forming a pivot point aligned with the midpoint of said hypotenuse and the inside pivot flange located a predetermined distance along an imaginary line bisecting said isosceles triangle and said flange being perpendicular to the mentioned hypotenuse with a second smaller reinforcing flange parallel to said hypotenuse welded to the inside edge of the pivot flange but located opposite the pivot flange's intended angling and squaring edge that is transversely aligned exactly on the midpoint of said hypotenuse; the first leg of said isosceles forming a protractor condition with the midpoint of the hypotenuse and said leg graduated from 0 to 90 degrees from the hypotenuse to apex of the isosceles and the second leg forming a protractor condition with mentioned inside pivot point and graduated from 90 to 0 degrees from the apex toward the hypotenuse, but short of the hypotenuse exactly the dimension the pivot flange creates, said inside pivot point being itself an apex for a smaller proportionate right isosceles triangle removed in actual material to reduce the weight of the device in the second of two equal halves formed figuratively by an imaginary line which is coincidental with the 90° apex point and the midpoint of said hypotenuse, with an even smaller right isosceles triangle removed in actual material from the first half section, said first section being heavier in mass than the second to retain the device balanced in place during actual use, said section is furthermore reduced in mass by four equal, rounded apertures bored out and removed in actual material; all four apertures located in line and parallel to said hypotenuse, cradeling in each a small leveling device that corresponds individually in parallel to each of the three legs of said isosceles triangle as well as to the stated pivot flange; said flange projects from the underside surface which is calibrated and graduated in a manner of a mirror reflection identical to the top surface so that the pivot points are identical and said device can be laid flatly upon its top surface and be used according to similar functions of measuring, angle marking, and squaring on a planar surface; or be used conversely with the pivot flange abutting and pivoting mentioned edges against a given material, and the calibrated hypotenuse forming a respective angle that can be utilized.

* * * * *